United States Patent
Yano

(10) Patent No.: US 8,977,406 B2
(45) Date of Patent: Mar. 10, 2015

(54) POWER SUPPLY SYSTEM, POWER SUPPLY CONTROL METHOD, POWER SUPPLY CONTROL DEVICE AND PROGRAM

(75) Inventor: Yuichi Yano, Tokyo (JP)

(73) Assignee: Nec Corporation, Tokyo (JP)

( * ) Notice: Subject to any disclaimer, the term of this patent is extended or adjusted under 35 U.S.C. 154(b) by 636 days.

(21) Appl. No.: 13/269,645

(22) Filed: Oct. 10, 2011

(65) Prior Publication Data

US 2012/0116601 A1  May 10, 2012

(30) Foreign Application Priority Data

Nov. 8, 2010 (JP) .................................. 2010-249262

(51) Int. Cl.
 G05D 3/12 (2006.01)
 G06F 1/26 (2006.01)
 G06F 1/30 (2006.01)
(52) U.S. Cl.
 CPC . *G06F 1/263* (2013.01); *G06F 1/30* (2013.01)
 USPC ....................................................... 700/292
(58) Field of Classification Search
 CPC ................................ G06F 1/263; G06F 1/30
 USPC ......................................................... 700/292
 See application file for complete search history.

(56) References Cited

U.S. PATENT DOCUMENTS

2002/0031000 A1\* 3/2002 Sakai et al. ...................... 363/65
2003/0222618 A1\* 12/2003 Kanouda et al. ............... 320/116
2006/0208572 A1\* 9/2006 Zansky et al. .................... 307/66
2009/0049322 A1\* 2/2009 Chang ............................ 713/340
2009/0072623 A1\* 3/2009 Liao ................................. 307/65

FOREIGN PATENT DOCUMENTS

| JP | S53120862 A | 10/1978 | |
| JP | 7-213060 A | 8/1995 | |
| JP | 2000-184621 A | 6/2000 | |
| JP | 2001-103679 | \* 4/2001 | ................ H02J 9/08 |
| JP | 2001103679 A | 4/2001 | |
| JP | 2007104834 A | 4/2007 | |

OTHER PUBLICATIONS

Japanese Office Action for JP2010-249262 mailed on Oct. 30, 2012.
Japanese Office Action for JP2010-249252 mailed on Jan. 22, 2013.
Japanese Office Action for JP Application No. 2010-249262 mailed on Oct. 1, 2013 with English Translation.

\* cited by examiner

*Primary Examiner* — Robert Fennema
*Assistant Examiner* — Sivalingam Sivanesan
(74) *Attorney, Agent, or Firm* — Sughrue Mion, PLLC

(57) ABSTRACT

A power supply system includes: a plurality of power supply devices; a battery device; an abnormal state detection unit that detects a state of a first power supply device is an abnormal state; and a switching control unit that, when it is detected the state of the first power supply device is the abnormal state, switches a state from an electric power input forbidding state in which electric power is not inputted into a second power supply device to an electric power input permitting state in which electric power is inputted into the second power supply device, and switches the state from an electric power supply forbidding state of not supplying the electric power stored by the battery device to the external load to an electric power supply permitting state of supplying the electric power stored by the battery device to the external load.

9 Claims, 4 Drawing Sheets

POWER SUPPLY SYSTEM, POWER SUPPLY CONTROL METHOD, POWER SUPPLY CONTROL DEVICE AND PROGRAM

INCORPORATION BY REFERENCE

This application is based upon and claims the benefit of priority from Japanese patent application No. 2010-249262, filed on Nov. 8, 2010, the disclosure of which is incorporated herein in its entirety by reference.

TECHNICAL FIELD

The present invention relates to a power supply system equipped with a plurality of power supply devices.

BACKGROUND ART

A power supply system that is equipped with a plurality of power supply devices converting inputted electric power and outputting the converted electric power and is configured to supply the outputted electric power to an external load is known. As one of the power supply systems of this type, a power supply system described in Patent Document 1 is capable of, even when the state of one of the power supply devices becomes abnormal (the abnormal state), supplying electric power required by the external load by using the other power supply device.

[Patent Document 1] Japanese Unexamined Patent Application Publication No. JP-A 7-213060

Before a power supply device gets ready to output a sufficient level of electric power after input of electric power into the power supply device starts, a given delay time is required. Therefore, in order to avoid shortage of electric power supplied to an external load when the state of the power supply device becomes abnormal, the power supply system described above previously inputs electric power to all of the power supply devices. In other words, the power supply system described above operates in hot-standby.

On the other hand, the efficiency of conversion of electric power by the power supply device (the electric power conversion efficiency) decreases when load on the power supply device (i.e., the level of electric power outputted by the power supply device) becomes excessively small. Moreover, as mentioned above, the power supply system described above supplies electric power outputted by all of the power supply devices to the external load. Therefore, before the state of any of the power supply devices becomes abnormal, load on each of the power supply devices is relatively small. Consequently, in the power supply system described above, there is a fear that the electric power conversion efficiency excessively decreases.

SUMMARY

Accordingly, an object of the present invention is to provide a power supply system capable of solving the aforementioned problems: electric power supplied to an external load may be short when the state of the power supply device becomes abnormal; and the electric power conversion efficiency may excessively decrease.

In order to achieve the object, a power supply system of an exemplary embodiment of the present invention is a system equipped with a plurality of power supply devices converting inputted electric power and outputting the converted electric power, and configured to supply the outputted electric power to an external load.

Moreover, this power supply system includes a battery device configured to store inputted electric power and supply the stored electric power to the external load, and also includes:

an abnormal state detection unit configured to detect that a state of a first power supply device that is one of the plurality of power supply devices is an abnormal state; and a switching control unit configured to, in a case that it is detected that the state of the first power supply device is the abnormal state, switch a state of the power supply system from an electric power input forbidding state in which electric power is not inputted into a second power supply device that is another one of the plurality of power supply devices to an electric power input permitting state in which electric power is inputted into the second power supply device, and switch the state of the power supply system from an electric power supply forbidding state of not supplying the electric power stored by the battery device to the external load to an electric power supply permitting state of supplying the electric power stored by the battery device to the external load.

Further, a power supply control method of another exemplary embodiment of the present invention is a method applied to a power supply system that is equipped with a plurality of power supply devices converting inputted electric power and outputting the converted electric power and is configured to supply the outputted electric power to an external load.

Moreover, the power supply system includes a battery device configured to store inputted electric power and supply the stored electric power to the external load.

Additionally, the power supply control method is a method including:

detecting that a state of a first power supply device that is one of the plurality of power supply devices is an abnormal state; and in a case that it is detected that the state of the first power supply device is the abnormal state, switching a state of the power supply system from an electric power input forbidding state in which electric power is not inputted into a second power supply device that is another one of the plurality of power supply devices to an electric power input permitting state in which electric power is inputted into the second power supply device, and switching the state of the power supply system from an electric power supply forbidding state of not supplying the electric power stored by the battery device to the external load to an electric power supply permitting state of supplying the electric power stored by the battery device to the external load.

Further, a power supply control device of another exemplary embodiment of the present invention is a device configured to control a power supply system that is equipped with a plurality of power supply devices converting inputted electric power and outputting the converted electric power and is configured to supply the outputted electric power to an external load.

Moreover, the power supply system includes a battery device configured to store inputted electric power and supply the stored electric power to the external load.

Additionally, the power supply control device includes:

an abnormal state detection unit configured to detect that a state of a first power supply device that is one of the plurality of power supply devices is an abnormal state; and a switching control unit configured to, in a case that it is detected that the state of the first power supply device is the abnormal state, switch a state of the power supply system from an electric power input forbidding state in which electric power is not inputted into a second power supply device that is another one of the plurality of power supply devices to an electric power input permitting state in which electric power is inputted into the second power supply device, and switch the state of the power supply system from an electric power supply forbidding state of not supplying the electric power stored by the battery device to the external load to an electric power supply permitting state of supplying the electric power stored by the battery device to the external load.

Further, a program of another exemplary embodiment of the present invention is a program executed by a power supply control device configured to control a power supply system that is equipped with a plurality of power supply devices converting inputted electric power and outputting the converted electric power and is configured to supply the outputted electric power to an external load.

Moreover, the power supply system includes a battery device configured to store inputted electric power and supply the stored electric power to the external load.

Additionally, the program is a program comprising instructions for causing the power supply control device to realize:

an abnormal state detection unit configured to detect that a state of a first power supply device that is one of the plurality of power supply devices is an abnormal state; and a switching control unit configured to, in a case that it is detected that the state of the first power supply device is the abnormal state, switch a state of the power supply system from an electric power input forbidding state in which electric power is not inputted into a second power supply device that is another one of the plurality of power supply devices to an electric power input permitting state in which electric power is inputted into the second power supply device, and switch the state of the power supply system from an electric power supply forbidding state of not supplying the electric power stored by the battery device to the external load to an electric power supply permitting state of supplying the electric power stored by the battery device to the external load.

With the configurations described above, the present invention can increase the electric power conversion efficiency while avoiding shortage of electric power supplied to an external load even if the state of the power supply device becomes abnormal.

EXEMPLARY EMBODIMENTS

Below, the respective exemplary embodiments of a power supply system, a power supply control method, a power supply control device and a program according to the present invention will be described with reference to FIGS. 1 to 4.

First Exemplary Embodiment

Configuration

Figure 1:
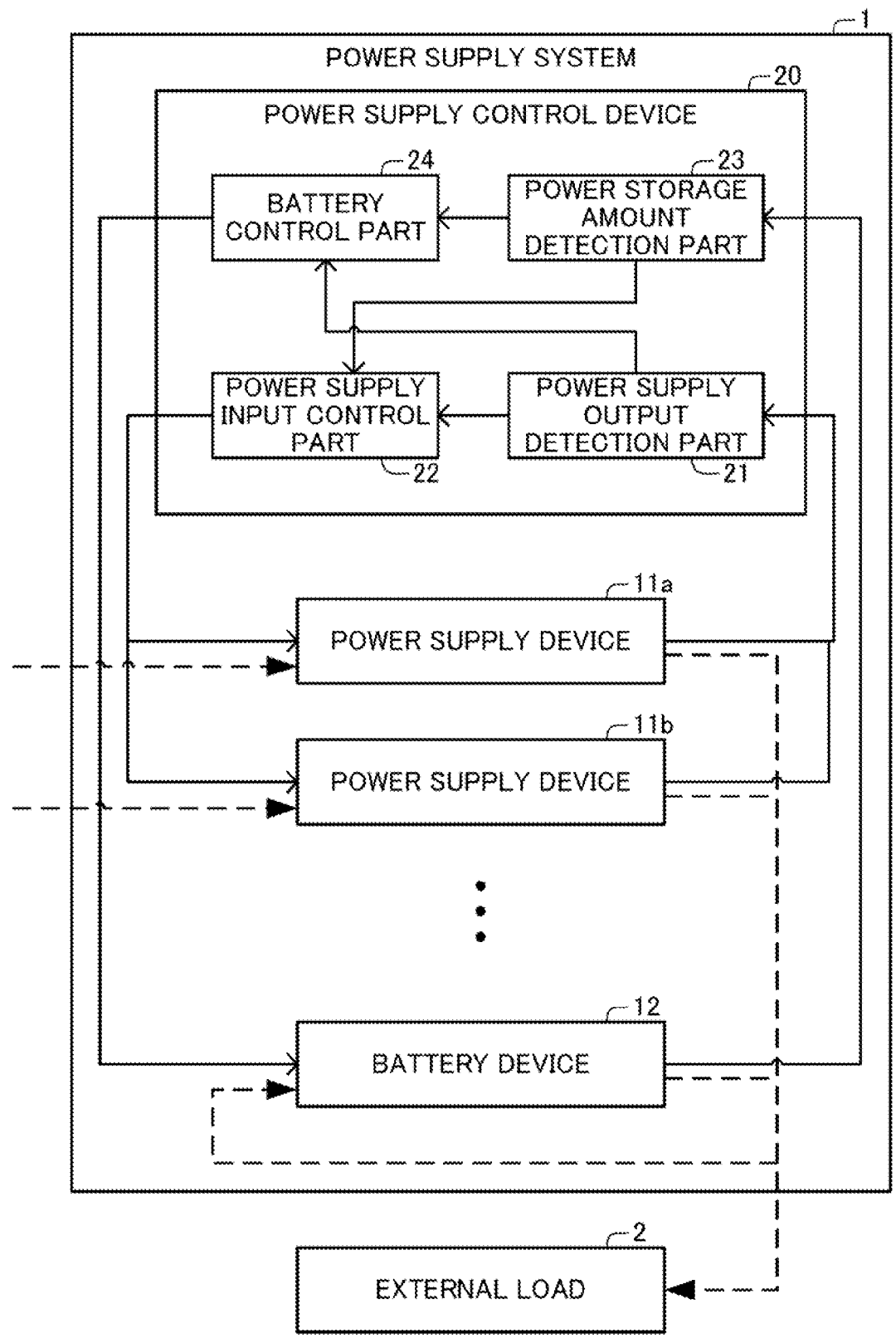
FIG. 1 is a diagram representing a schematic configuration of a power supply system according to a first exemplary embodiment of the present invention.

As shown in FIG. 1, a power supply system 1 according to a first exemplary embodiment is equipped with a plurality of power supply devices 11a, 11b . . . , a battery device 12, and a power supply control device 20.

The respective power supply devices 11a, 11b . . . are supplied with AC power inputted by an external power supply (e.g., a commercial power supply), convert the inputted AC power into DC power, and output the converted DC power. In this embodiment, the power supply device 11a is a redundant (i.e., auxiliary) power supply device (in this description, may be referred to as a "second power supply device"). Moreover, each of the power supply devices 11b . . . is a working (operating) power supply device (in this description, may be referred to as a "first power supply device").

The battery device 12 is equipped with a secondary cell. The battery device 12 stores electric power inputted thereinto in the secondary cell, and also outputs the stored electric power.

The power supply system 1 is configured to be capable of supplying the electric power outputted by the respective power supply devices 11a, 11b . . . to an external load 2. In this embodiment, the external load 2 is a server device (an information processing device). The external load 2 may be a device or an apparatus driven by electric power, other than a server device.

Moreover, the power supply system 1 is configured to be capable of supplying the electric power outputted by the battery device 12 to the external load 2.

Further, the power supply system 1 is configured in a manner that the state of the power supply system 1 switches, for each of the plurality of power supply devices 11a, 11b . . . , between an electric power input permitting state of inputting electric power into the power supply device 11a, 11b . . . and an electric power input forbidding state of not inputting electric power into the power supply device 11a, 11b . . . .

In this embodiment, the power supply system 1 is equipped with relay circuits whose states switch, for the respective power supply devices 11a, 11b . . . , between an electric power input permitting state and an electric power input forbidding state. That is to say, the state of each of the relay circuits switches between the electric power input permitting state of connecting the external power supply with a certain power supply device 11a, 11b . . . and the electric power input forbidding state of blocking connection of the external power supply with the power supply device 11a, 11b . . . .

Further, the power supply system 1 is configured in a manner that the state of the power supply system 1 switches between an electric power supply permitting state of supplying the electric power stored in the battery device 12 to the external load 2 and an electric power supply forbidding state of not supplying the electric power stored in the battery 12 to the external load 2.

In this embodiment, the power supply system 1 is equipped with a relay circuit whose state switches between an electric power supply permitting state and an electric power supply forbidding state. That is to say, the state of this relay circuit switches between the electric power supply permitting state of connecting the external load 2 with the battery device 12 and the electric power supply forbidding state of blocking connection of the external load 2 with the battery device 12.

Further, the power supply system 1 is configured in a manner that the state of the power supply system 1 switches between a power storage permitting state of supplying the electric power outputted by the respective power supply devices 11a, 11b . . . to the battery device 12 and a power storage forbidding state of not supplying the electric power outputted by the respective power supply devices 11a, 11b . . . to the battery device 12.

In this embodiment, the power supply system 1 is equipped with a relay circuit whose state switches between a power storage permitting state and a power storage forbidding state. That is to say, the state of this relay circuit switches between the power storage permitting state of connecting the battery device 12 with each of the plurality of power supply devices 11*a*, 11*b* . . . and the power storage forbidding state of blocking connection of the battery device 12 with each of the plurality of power supply device 11*a*, 11*b* . . . .

The power supply control device 20 is equipped with a power supply output detection part 21 (an abnormal state detection unit, an output electric power detection unit), a power supply input control part 22 (part of a switching control unit), a power storage amount detection part 23 (a power storage amount detection unit), and a battery control part 24 (part of the switching control unit).

The power supply output detection part 21 detects electric power outputted by the respective power supply devices 11*a*, 11*b* . . . (the output electric power). Moreover, with respect to each of the power supply devices 11*a*, 11*b* . . . , the power supply output detection part 21 detects that the state of the power supply device 11*a*, 11*b* . . . is abnormal (the abnormal state) in a case that the level of the detected output electric power is smaller than a preset abnormality threshold.

The power supply output detection Part 21 may be configured to detect that the state of the power supply device 11*a*, 11*b* . . . is abnormal in a case that the amount of variation of the level of the detected output electric power in a preset period is larger than a preset threshold variation amount.

The power storage amount detection part 23 detects the amount of power storage, which is the amount of electric power stored by the battery device 12.

The power supply input control part 22, when an operation of the power supply system 1 starts, sets the state to the electric power input permitting state for each of the power supply devices 11*b* . . . serving as working power supply devices, and sets the state to the electric power input forbidding state for the power supply device 11*a* serving as a redundant power supply device.

Further, when the power storage amount detected by the power storage amount detection part 23 is smaller than a lower-limit threshold power storage amount that is previously set, the power supply input control part 22 switches the state of the power system 1 for the power supply device 11*a* from the electric power input forbidding state to the electric power input permitting state.

After that, when the power storage amount detected by the power storage amount detection part 23 exceeds an upper-limit threshold power storage amount that is previously set, the power supply input control part 22 switches the state of the power supply system 1 for the power supply device 11*a* from the electric power input permitting state to the electric power input forbidding state. In this embodiment, the upper-limit threshold power storage amount is larger than the lower-limit threshold power storage amount.

In addition, when the power supply output detection part 21 detects that the state of any of the working power supply devices 11*b* . . . is abnormal, the power supply input control part 22 switches the state of the power supply system 1 for the power supply device 11*a* from the electric power input forbidding state to the electric power input permitting state.

When the operation of the power supply system 1 starts, the battery control part 24 sets the state of the power system 1 to the electric power supply forbidding state, and also sets the state of the power supply system 1 to the power storage forbidding state.

Further, in a case that the power storage amount detected by the power storage amount detection part 23 is smaller than the lower-limit threshold power storage amount, the battery control part 24 switches the state of the power supply system 1 from the power storage forbidding state to the power storage permitting state.

After that, in a case that the power storage amount detected by the power storage amount detection part 23 exceeds the upper-limit threshold power storage amount, the battery control part 24 switches the state of the power supply system 1 from the power storage permitting state to the power storage forbidding state.

In addition, in a case that the power supply output detection part 21 detects that the state of any of the working power supply devices 11*b* . . . is abnormal, the battery control part 24 switches the state of the power supply system 1 from the electric power supply forbidding state to the electric power supply permitting state.

After that, in a case that the level of electric power detected for the power supply device 11*a* by the power supply output detection part 21 exceeds preset threshold electric power, the battery control part 24 switches the state of the power supply system 1 from the electric power supply permitting state to the electric power supply forbidding state.

(Operation)

Next, an operation of the power supply system 1 described above will be explained.

Firstly, when the operation of the power supply system 1 starts, the power supply control device 20 sets the state to the electric power input permitting state for each of the power supply devices 11*b* . . . that are working power supply devices, and also sets the state to the electric power input forbidding state for the power supply device 11*a* that is a redundant power supply device. Moreover, at this time, the power supply control device 20 sets the state of the power supply system 1 to the electric power supply forbidding state, and also sets the state of the power supply system 1 to the power storage forbidding state.

That is to say, at this moment, the power supply system 1 supplies electric power outputted by each of the power supply devices 11*b* . . . that are working power supply devices to the external load 2. The battery device 12 does not supply electric power to the external load 2. Besides, the electric power outputted by each of the power supply devices 11*b* . . . is not supplied to the battery device 12.

Figure 2:
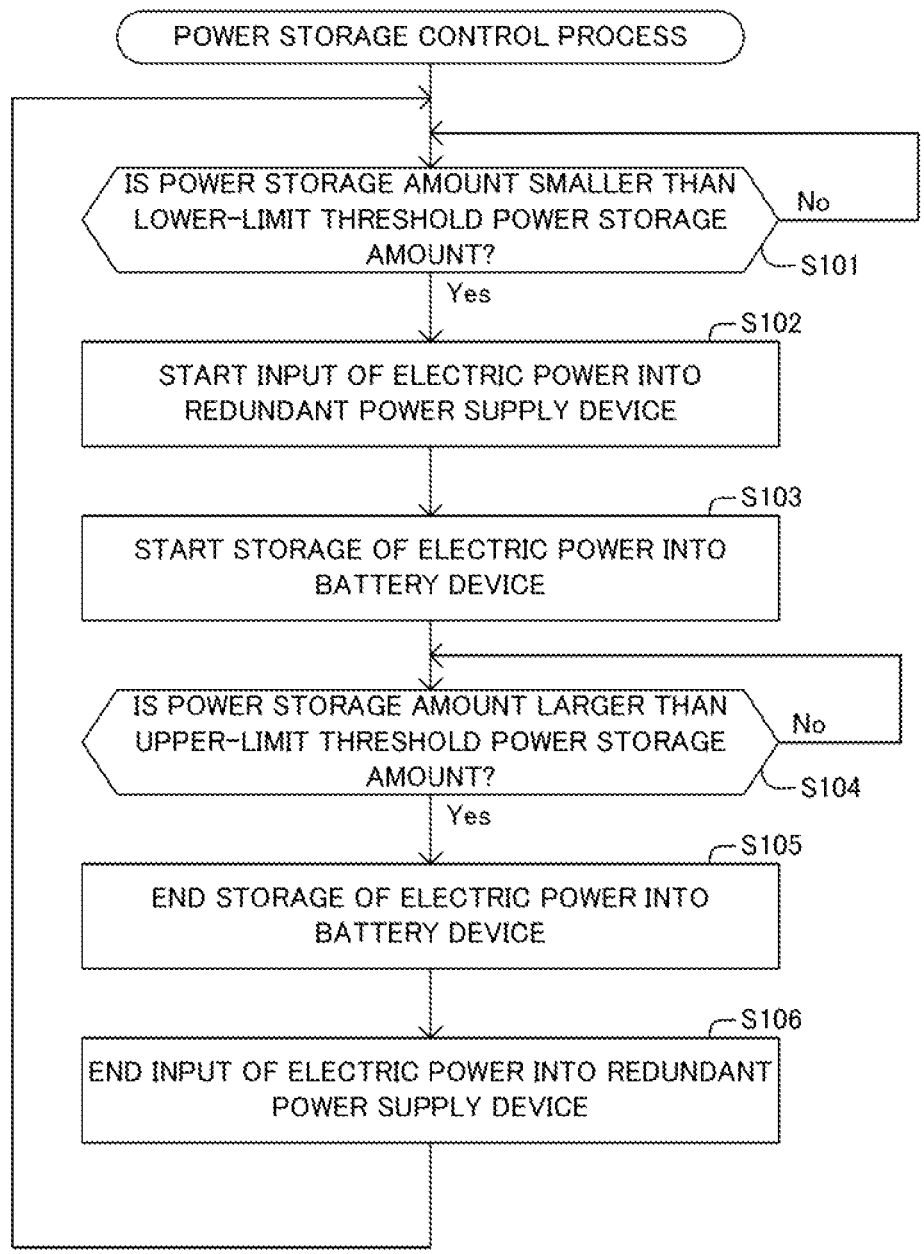
FIG. 2 is a flowchart showing a power storage control process executed by a power supply control device of the first exemplary embodiment of the present invention.

On the other hand, the power supply control device 20 is configured to execute a power storage control process shown by a flowchart in FIG. 2.

To be specific, upon starting the power storage control process, the power supply control device 20 stands by until the power storage amount falls below the lower-limit threshold power storage amount (step S101). Then, when the power storage amount falls below the lower-limit threshold power storage amount, the power supply control device 20 determines "Yes" and proceeds to step S102.

Next, the power supply control device 20 starts input of electric power into the redundant power supply device (in this embodiment, the power supply device 11*a*). To be specific, the power supply control device 20 switches the state of the power supply system 1 for the power supply device 11*a* from the electric power input forbidding state to the electric power input permitting state.

Then, the power supply control device 20 starts storage of power into the battery device 12 (step S103). To be specific, the power supply control device 20 switches the state of the power supply system 1 from the power storage forbidding state to the power storage permitting state. Consequently, part of the electric power outputted by each of the plurality of power supply devices 11a, 11b . . . is supplied to the external load 2, and the rest of the outputted electric power is supplied to the battery device 12. As a result, the battery device 12 stores electric power into the secondary cell.

Next, the power supply control device 20 stands by until the power storage amount exceeds the upper-limit threshold power storage amount (step S104). Then, when the power storage amount exceeds the upper-limit threshold power storage amount, the power supply control device 20 determines "Yes" and proceeds to step S105.

Next, the power supply control device 20 ends storage of electric power into the battery device 12. To be specific, the power supply control device 20 switches the state of the power supply system 1 from the power storage permitting state to the power storage forbidding state. Then, the power supply control device 20 ends input of electric power into the redundant power supply device (in this embodiment, the power supply device 11a) (step S106). To be specific, the power supply control device 20 switches the state of the power supply system 1 for the power supply device 11a from the electric power input permitting state to the electric power input forbidding state.

After that, the power supply control device 20 returns to step S101, and repeatedly executes the process from step S101 to step S106.

Figure 3:
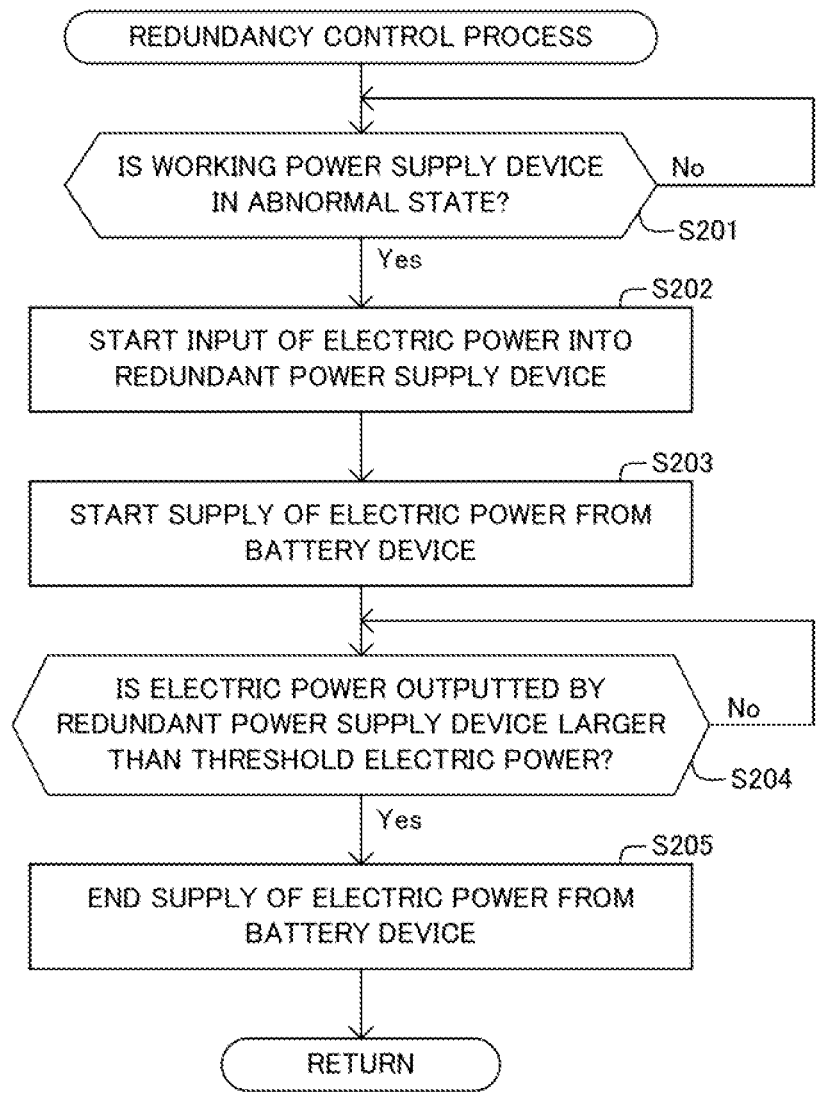
FIG. 3 is a flowchart showing a redundancy control process executed by the power supply control device of the first exemplary embodiment of the present invention.

Further, the power supply control device 20 is configured to execute a redundancy control process shown by a flowchart in FIG. 3.

To be specific, upon starting the redundancy control process, the power supply control device 20 stands by until it is detected that any of the working power supply devices 11b is in the abnormal state (step S201).

Then, when it is detected that any of the working power supply devices 11b . . . is in the abnormal state, the power supply control device 20 determines "Yes" and proceeds to step S202. Next, the power supply control device 20 starts input of electric power into the redundant power supply device (in this embodiment, the power supply device 11a). To be specific, the power supply control device 20 switches the state of the power supply system 1 for the power supply device 11a from the electric power input forbidding state to the electric power input permitting state.

Furthermore, the power supply control device 20 starts supply of electric power from the battery device 12 to the external load 2 (step S203). To be specific, the power supply control device 20 switches the state of the power supply system 1 from the electric power supply forbidding state to the electric power supply permitting state.

Consequently, all of the electric power outputted by each of the plurality of power supply devices 11a, 11b . . . and the electric power outputted by the battery device 12 are supplied to the external load 2. Therefore, even in a period before the power supply device 11a outputs a sufficient level of electric power (electric power equal to or more than threshold electric power), it is possible to prevent shortage of electric power supplied to the external load 2.

Next, the power supply control device 20 stands by until the level of the electric power outputted by the redundant power supply device (in this embodiment, the power supply device 11a) exceeds the threshold electric power (step S204). Then, when the level of the electric power outputted by the redundant power supply device exceeds the threshold electric power, the power supply control device 20 determines "Yes" and proceeds to step S205.

Then, the power supply control device 20 ends supply of electric power from the battery device 12 to the external load 2. To be specific, the power supply control device 20 switches the state of the power supply system 1 from the electric power supply permitting state to the electric power supply forbidding state. Consequently, only the electric power outputted by each of the plurality of power supply devices 11a, 11b . . . is supplied to the external load 2. After that, the power supply control device 20 ends execution of this redundancy control process.

As described above, according to the power supply system 1 of the first exemplary embodiment, in a case that the state of any of the working power supply devices 11b . . . (a first power supply device) becomes abnormal, electric power stored by the battery device 12 is supplied to the external load 2. Consequently, even in a period before the redundant power supply device 11a (a second power supply device) outputs a sufficient level of electric power, it is possible to prevent shortage of electric power supplied to the external load 2.

Furthermore, the power supply system 1 of the first exemplary embodiment does not input electric power into the redundant power supply device 11a (the second power supply device) until the state of any of the working power supply devices 11b . . . (the first power supply device) becomes abnormal. Therefore, it is possible to make the electric power conversion efficiency higher than in the case of inputting electric power into the second power supply device until the state of the first power supply device becomes abnormal.

Thus, according to the power supply system 1 of the first exemplary embodiment, even when the state of the working power supply device 11b . . . becomes abnormal, it is possible to increase the electric power conversion efficiency while preventing shortage of electric power supplied to the external load 2.

In addition, the power supply system 1 of the first exemplary embodiment switches the state of the power supply system 1 to the electric power supply forbidding state in a case that the level of electric power outputted by the redundant power supply device 11a (the second power supply device) exceeds the threshold electric power.

According to this, at a moment that the redundant power supply device 11a (the second power supply device) gets ready to output a sufficient level of electric power, supply of electric power from the battery device 12 to the external load 2 is stopped. Consequently, it is possible to prevent wasteful consumption of electric power stored by the battery device 12.

Furthermore, the power supply system 1 of the first exemplary embodiment is configured to be capable of supplying electric power outputted by the power supply devices 11a, 11b . . . to the battery device 12.

Consequently, it is possible to store electric power in the battery device 12.

In addition, in a case that the power storage amount of the battery device 12 is smaller than the threshold power storage amount, the power supply system 1 of the first exemplary embodiment switches the state of the power supply system 1 from the electric power input forbidding state to the electric power input permitting state, and also switches the state of the power supply system 1 from the power storage forbidding state to the power storage permitting state.

According to this, in a case that the power storage amount of the battery device 12 is relatively small, the redundant power supply device 11a (the second power supply device) outputs electric power, and electric power outputted by the power supply devices 11a, 11b . . . is supplied to the battery device 12. Consequently, it is possible to store electric power into the battery device 12 while preventing shortage of electric power supplied to the external load 2.

The power supply system 1 of the first exemplary embodiment is configured to use only one redundant power supply device, but may be configured to use a plurality of redundant power supply devices. In this case, the power supply system 1 may be equipped with the same number of battery devices 12 as the number of power supply devices used as the redundant power supply devices. Moreover, the power supply system 1 may be equipped with only one battery device 12 capable of outputting the same level of electric power as the sum of the levels of electric power outputted by the power supply devices used as the redundant power supply devices.

Second Exemplary Embodiment

Figure 4:
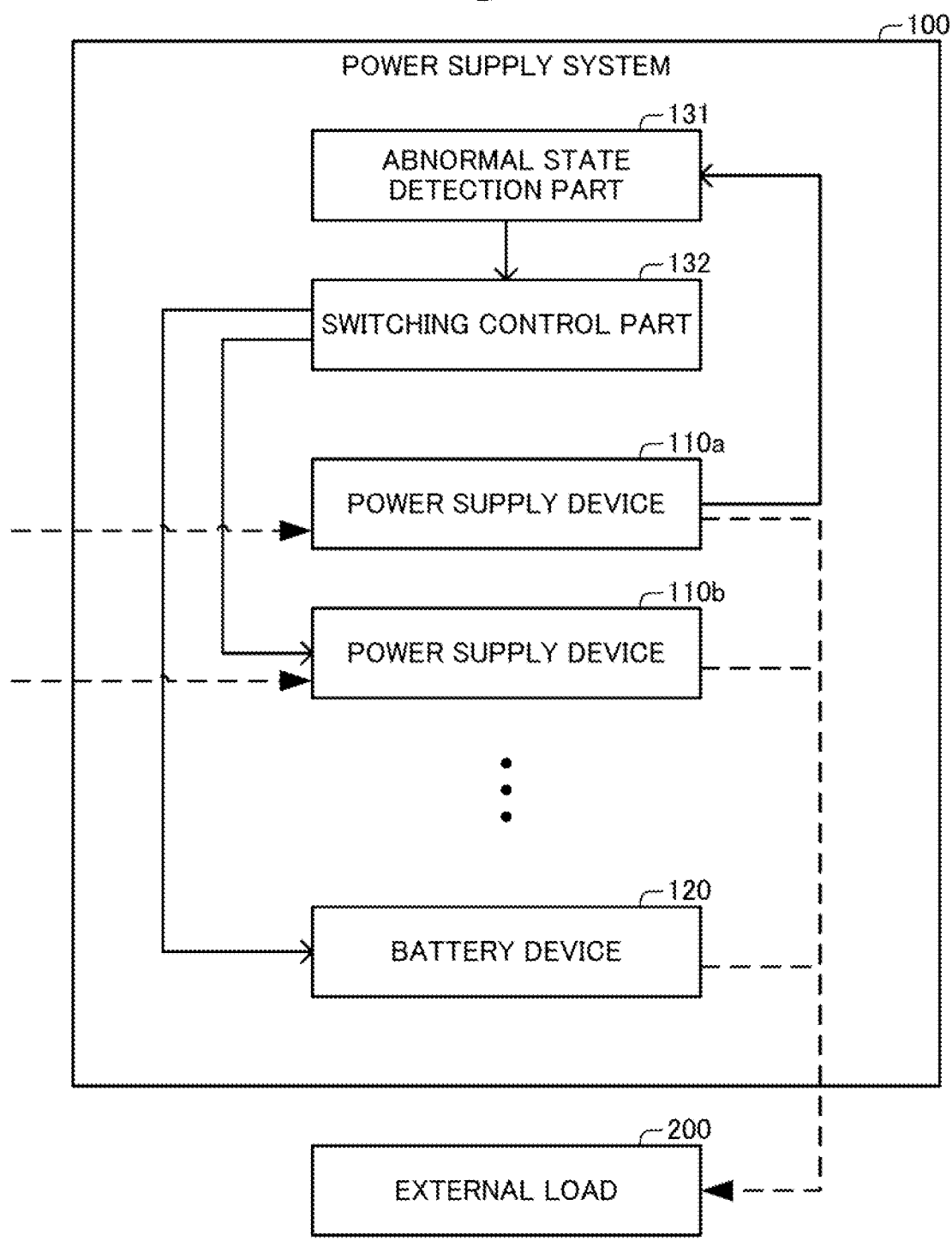
FIG. 4 is a diagram representing a schematic configuration of a power supply system according to a second exemplary embodiment of the present invention.

Next, a power supply system according to a second exemplary embodiment of the present invention will be described with reference to FIG. 4.

A power supply system 100 according to the second exemplary embodiment is a system equipped with a plurality of power supply devices 110a, 110b . . . converting inputted electric power and outputting the converted electric power, and configured to supply the outputted electric power to an external load 200.

Furthermore, this power supply system 100 includes a battery device 120 configured to store inputted electric power and supply the stored electric power to the external load 200, and also includes:

an abnormal state detection unit (an abnormal state detection means) 131 configured to detect that a state of a first power supply device 110a that is one of the plurality of power supply devices 110a, 110b . . . is an abnormal state; and a switching control unit (a switching control means) 132 configured to, in a case that it is detected that the state of the first power supply device 110a is the abnormal state, switch a state of the power supply system 100 from an electric power input forbidding state in which electric power is not inputted into a second power supply device 110b that is another one of the plurality of power supply devices 110a, 110b . . . to an electric power input permitting state in which electric power is inputted into the second power supply device 110b, and switch the state of the power supply system 100 from an electric power supply forbidding state of not supplying the electric power stored by the battery device 120 to the external load 200 to an electric power supply permitting state of supplying the electric power stored by the battery device 120 to the external load 200.

According to this, in a case that the state of the first power supply device 110a becomes abnormal, electric power stored by the battery device 120 is supplied to the external load 200. Consequently, it is possible to prevent shortage of electric power supplied to the external load 200 even in a period before the second power supply device 110b outputs a sufficient level of electric power.

That is to say, according to the abovementioned configuration, even if configuring not to input electric power into the second power supply device 110b until the state of the first power supply device 110a becomes abnormal, it is possible to prevent shortage of electric power supplied to the external load 200 in a case that the state of the first power supply device 110a becomes abnormal. Therefore, it is possible to make the electric power conversion efficiency higher than in the case of inputting electric power into the second power supply device 110b until the state of the first power supply device 110a becomes abnormal.

Thus, according to the abovementioned configuration, it is possible to increase the electric power conversion efficiency while preventing shortage of electric power supplied to the external load 200 even if the state of the first power supply device 110a becomes abnormal.

Although the present invention has been described with reference to the respective exemplary embodiments described above, the present invention is not limited to the abovementioned exemplary embodiments. The configuration and details of the present invention can be altered within the scope of the present invention in various manners that can be understood by those skilled in the art.

The respective functions of the power supply system in the respective exemplary embodiments described above are realized by hardware such as a circuit. The power supply system may be equipped with a processing device and a storage device storing a program (software), and may be configured to realize the respective functions by execution of the program by the processing device.

In this case, the program may be stored in a recording medium that can be read by a computer. For example, the recording medium is a portable medium such as a flexible disk, an optical disk, a magneto-optical disk, and a semiconductor memory.

Further, as another modified example of the exemplary embodiment described above, any combination of the aforementioned exemplary embodiments and modified examples may be employed.

<Supplementary Notes>

The whole or part of the exemplary embodiments disclosed above can be described as, but not limited to, the following supplementary notes.

(Supplementary Note 1)

A power supply system equipped with a plurality of power supply devices converting inputted electric power and outputting the converted electric power, and configured to supply the outputted electric power to an external load, the power supply system comprising a battery device configured to store inputted electric power and supply the stored electric power to the external load, the power supply system also comprising:

an abnormal state detection unit configured to detect that a state of a first power supply device that is one of the plurality of power supply devices is an abnormal state; and a switching control unit configured to, in a case that it is detected that the state of the first power supply device is the abnormal state, switch a state of the power supply system from an electric power input forbidding state in which electric power is not inputted into a second power supply device that is another one of the plurality of power supply devices to an electric power input permitting state in which electric power is inputted into the second power supply device, and switch the state of the power supply system from an electric power supply forbidding state of not supplying the electric power stored by the battery device to the external load to an electric power supply permitting state of supplying the electric power stored by the battery device to the external load.

According to this, in a case that the state of the first power supply device becomes abnormal, electric power stored by the battery device is supplied to the external load. Consequently, it is possible to prevent shortage of electric power supplied to the external load even in a period before the second power supply device outputs a sufficient level of electric power.

That is to say, according to the abovementioned configuration, even if configuring not to input electric power into the second power supply device until the state of the first power supply device becomes abnormal, it is possible to prevent shortage of electric power supplied to the external load even in a case that the state of the first power supply device becomes abnormal. Therefore, it is possible to make the electric power conversion efficiency higher than in the case of inputting electric power into the second power supply devices until the state of the first power supply device becomes abnormal.

Thus, according to the abovementioned configuration, it is possible to increase the electric power conversion efficiency while preventing shortage of electric power supplied to the external load even in a case that the state of the power supply device is brought into the abnormal state.

(Supplementary Note 2)

The power supply system according to Supplementary Note 1, comprising an output electric power detection unit configured to detect electric power outputted by the second power supply device, wherein the switching control unit is configured to switch the state of the power supply system to the electric power supply forbidding state in a case that a level of the detected electric power exceeds preset threshold electric power.

(Supplementary Note 3)

The power supply system according to Supplementary Note 1 or 2, wherein the switching control unit is configured to keep the power supply system in the electric power input forbidding state until it is detected that the state of the first power supply device is the abnormal state.

According to this, at a moment that the second power supply device gets ready to output a sufficient level of electric power, supply of electric power from the battery device to the external load is stopped. Consequently, it is possible to prevent wasteful consumption of electric power stored by the battery device.

(Supplementary Note 4)

The power supply system according to any of Supplementary Notes 1 to 3, wherein the state of the power supply system is switched between a power storage permitting state of supplying the electric power outputted by the power supply device to the battery device and a power storage forbidding state of not supplying the electric power outputted by the power supply device to the battery device.

According to this, it is possible to store electric power in the battery device.

(Supplementary Note 5)

The power supply system according to Supplementary Note 4, comprising a power storage amount detection unit configured to detect a power storage amount that is an amount of the electric power stored by the battery device, wherein the switching control unit is configured to, in a case that the detected power storage amount is smaller than a preset threshold power storage amount, switch the state of the power supply system from the electric power input forbidding state to the electric power input permitting state, and switch the state of the power supply system from the power storage forbidding state to the power storage permitting state.

According to this, in a case that the power storage amount of the battery device is relatively small, the second power supply device outputs electric power, and electric power outputted by the power supply device is supplied to the battery device. Consequently, it is possible to store electric power in the battery device while preventing shortage of electric power supplied to the external load.

(Supplementary Note 6)

The power supply system according to Supplementary Notes 1 to 5, wherein the power supply device is configured to receive inputted AC power, convert the inputted AC power to DC power, and output the converted DC power.

(Supplementary Note 7)

A power supply control method applied to a power supply system that is equipped with a plurality of power supply devices converting inputted electric power and outputting the converted electric power and is configured to supply the outputted electric power to an external load, the power supply system comprising a battery device configured to store inputted electric power and supply the stored electric power to the external load, the power supply control method comprising:

detecting that a state of a first power supply device that is one of the plurality of power supply devices is an abnormal state; and in a case that it is detected that the state of the first power supply device is the abnormal state, switching a state of the power supply system from an electric power input forbidding state in which electric power is not inputted into a second power supply device that is another one of the plurality of power supply devices to an electric power input permitting state in which electric power is inputted into the second power supply device, and switching the state of the power supply system from an electric power supply forbidding state of not supplying the electric power stored by the battery device to the external load to an electric power supply permitting state of supplying the electric power stored by the battery device to the external load.

(Supplementary Note 8)

The power supply control method according to Supplementary Note 7, comprising:

detecting electric power outputted by the second power supply device; and switching the state of the power supply system to the electric power supply forbidding state in a case that a level of the detected electric power exceeds preset threshold electric power.

(Supplementary Note 9)

The power supply control method according to Supplementary Note 7 or 8, comprising keeping the power supply system in the electric power input forbidding state until it is detected that the state of the first power supply device is the abnormal state.

(Supplementary Note 10)

A power supply control device configured to control a power supply system that is equipped with a plurality of power supply devices converting inputted electric power and outputting the converted electric power and is configured to supply the outputted electric power to an external load, the power supply system comprising a battery device configured to store inputted electric power and supply the stored electric power to the external load, the power supply control device comprising:

an abnormal state detection unit configured to detect that a state of a first power supply device that is one of the plurality of power supply devices is an abnormal state; and a switching control unit configured to, in a case that it is detected that the state of the first power supply device is the abnormal state, switch a state of the power supply system from an electric power input forbidding state in which electric power is not inputted into a second power supply device that is another one of the plurality of power supply devices to an electric power input permitting state in which electric power is inputted into the second power supply device, and switch the state of the power supply system from an electric power supply forbidding state of not supplying the electric power stored by the battery device to the external load to an electric power supply permitting state of supplying the electric power stored by the battery device to the external load.

(Supplementary Note 11)

The power supply control device according to Supplementary Note 10, comprising an output electric power detection unit configured to detect electric power outputted by the second power supply device, wherein the switching control unit is configured to switch the state of the power supply system to the electric power supply forbidding state in a case that a level of the detected electric power exceeds preset threshold electric power.

(Supplementary Note 12)

The power supply control device according to Supplementary Note 10 or 11, wherein the switching control unit is configured to keep the power supply system in the electric power input forbidding state until it is detected that the state of the first power supply device is the abnormal state.

(Supplementary Note 13)

A computer-readable recording medium recording a program executed by a power supply control device configured to control a power supply system that is equipped with a plurality of power supply devices converting inputted electric power and outputting the converted electric power and is configured to supply the outputted electric power to an external load, the power supply system comprising a battery device configured to store inputted electric power and supply the stored electric power to the external load, the program comprising instructions for causing the power supply control device to realize:

an abnormal state detection unit configured to detect that a state of a first power supply device that is one of the plurality of power supply devices is an abnormal state; and a switching control unit configured to, in a case that it is detected that the state of the first power supply device is the abnormal state, switch a state of the power supply system from an electric power input forbidding state in which electric power is not inputted into a second power supply device that is another one of the plurality of power supply devices to an electric power input permitting state in which electric power is inputted into the second power supply device, and switch the state of the power supply system from an electric power supply forbidding state of not supplying the electric power stored by the battery device to the external load to an electric power supply permitting state of supplying the electric power stored by the battery device to the external load.

(Supplementary Note 14)

The recording medium according to Supplementary Note 13, wherein:

the program comprises instructions for causing the power supply control device to further realize an output electric power detection unit configured to detect electric power outputted by the second power supply device; and the switching control unit is configured to switch the state of the power supply system to the electric power supply forbidding state in a case that a level of the detected electric power exceeds preset threshold electric power.

(Supplementary Note 15)

The recording medium according to Supplementary Note 13 or 14, wherein the switching control unit is configured to keep the power supply system in the electric power input forbidding state until it is detected that the state of the first power supply device is the abnormal state.

(Supplementary Note 16)

A power supply system equipped with a plurality of power supply devices converting inputted electric power and outputting the converted electric power, and configured to supply the outputted electric power to an external load, the power supply system comprising a battery device configured to store inputted electric power and supply the stored electric power to the external load, the power supply system also comprising:

an abnormal state detection means for detecting that a state of a first power supply device that is one of the plurality of power supply devices is an abnormal state; and a switching control means for, in a case that it is detected that the state of the first power supply device is the abnormal state, switching a state of the power supply system from an electric power input forbidding state in which electric power is not inputted into a second power supply device that is another one of the plurality of power supply devices to an electric power input permitting state in which electric power is inputted into the second power supply device, and switching the state of the power supply system from an electric power supply forbidding state of not supplying the electric power stored by the battery device to the external load to an electric power supply permitting state of supplying the electric power stored by the battery device to the external load.

(Supplementary Note 17)

A power supply control device configured to control a power supply system that is equipped with a plurality of power supply devices converting inputted electric power and outputting the converted electric power and is configured to supply the outputted electric power to an external load, the power supply system comprising a battery device configured to store inputted electric power and supply the stored electric power to the external load, the power supply control device comprising:

an abnormal state detection means for detecting that a state of a first power supply device that is one of the plurality of power supply devices is an abnormal state; and a switching control means for, in a case that it is detected that the state of the first power supply device is the abnormal state, switching a state of the power supply system from an electric power input forbidding state in which electric power is not inputted into a second power supply device that is another one of the plurality of power supply devices to an electric power input permitting state in which electric power is inputted into the second power supply device, and switching the state of the power supply system from an electric power supply forbidding state of not supplying the electric power stored by the battery device to the external load to an electric power supply permitting state of supplying the electric power stored by the battery device to the external load.

The present invention can be applied to a power supply system equipped with a plurality of power supply devices, and the like.

The invention claimed is:

1. A power supply system comprising:
   first and second power supply devices configured to supply electric power to an external load;
   a battery device configured to store electric power and supply the stored electric power to the external load;
   a power supply control device configured to:
      detect an abnormal state of the first power supply device;
      switch a first operating state of the power supply system from an electric power input forbidding state to an electric power input permitting state in response to the detected abnormal state, wherein:
         in the electric power input forbidding state, electric power is not inputted into the second power supply device; and
         in the electric power input permitting state, electric power is inputted into the second power supply device;

switch a second operating state of the power supply system from an electric power supply forbidding state to an electric power supply permitting state in response to the detected abnormal state, wherein:
    in the electric power supply forbidding state, the stored electric power is not supplied from the battery device to the external load; and
    in the electric power supply permitting state, the stored electric power is supplied from the battery device to the external load;
detect a level of electric power outputted by the second power device once the first operating state of the power supply system is switched to the electric power input permitting state; and
switch the second operating state of the power supply system from the electric power supply permitting state to the electric power supply forbidding state when the detected level of electric power outputted by the second power supply device exceeds a predetermined threshold.

2. The power supply system according to claim 1, wherein the power supply control device is configured to keep the second operating state of the power supply system in the electric power input forbidding state until the abnormal state of the first power supply device is detected.

3. The power supply system according to claim 1, wherein the power supply control device is configured to switch a third operating state of the power supply system between a power storage permitting state and a power storage forbidding state, wherein:
    in the power storage, permitting state, at least one of the first or second power supply device outputs electric power to the battery device; and
    in the power storage forbidding state, none of the first and second power supply device outputs electric power to the battery device.

4. The power supply system according to claim 3, wherein the power supply control device is configured to:
    detect an amount of power stored by the battery device;
    switch the first operating state of the power supply system from the electric power input forbidding state to the electric power input permitting state when the detected amount of power stored by the battery device is smaller than a predetermined threshold power storage amount; and
    switch the second operating state of the power supply system from the power storage forbidding state to the power storage permitting state.

5. The power supply system according to claim 1, wherein the power supply device is configured to receive inputted AC power, convert the inputted AC power to DC power, and output the converted DC power.

6. A power supply control method for controlling supply of electric power to an external load, comprising:
    detecting, by a power supply control device, an abnormal state of the first power supply device;
    switching a first operating state of the power supply system from an electric power input forbidding state to an electric power input permitting state in response to the detected abnormal state, wherein:
        in the electric power input forbidding state, electric power is not inputted into a second power supply device; and
        in the electric power input permitting state, electric power is inputted into the second power supply device;
    switching a second operating state of the power supply system from an electric power supply forbidding state to an electric power supply permitting state in response to the detected abnormal state, wherein:
        in the electric power supply forbidding state, stored electric power is not supplied from a battery device to the external load; and
        in the electric power supply permitting state, the stored electric power is supplied from the battery device to the external load;
    detecting, by the power supply control device, a level of electric power outputted by the second power supply device once the first operating state of the power supply system is switched to the electric power input permitting state; and
    switching the second operating state of the power supply system from the electric power supply permitting state to the electric power supply forbidding state when the detected level of electric power outputted by the second power supply device exceeds a predetermined threshold.

7. The power supply control method according to claim 6, comprising keeping the second operating state of the power supply system in the electric power input forbidding state until the abnormal state of the first power supply device is detected.

8. A power supply control device configured to control a power supply system that is equipped with first and second, supply devices configured to supply electric power to an external load and a battery device configured to store electric power and supply the stored electric power to the external load, the power supply control device comprising:
    an abnormal state detection device configured to detect an abnormal state of the first power supply device;
    a switching control device configured to:
        switch a first operating state of the power supply system from an electric power input forbidding state to an electric power input permitting state in response to the detected abnormal state, wherein:
            in the electric power input forbidding state, electric power is not inputted into the second power supply device; and
            in the electric power input forbidding state, electric power is inputted into the second power supply device; and
        switch a second operating state of the power supply system from an electric power supply forbidding state to an electric power supply permitting state in response to the detected abnormal state, wherein:
            in the electric power supply forbidding state, the stored electric power is not supplied from the batter device to the external load; and
            in the electric power supply permitting state, the stored electric power is supplied from the battery device to the external load; and
    an output electric power detection device configured to detect a level of electric power outputted by the second power supply device once the first operating state of the power supply system is switched to the electric power input permitting state;
    wherein the switch control device is configured to switch the second operating state of the power system from the electric power suply permitting state to the electric power supply forbidding state when the detected level of electric power outputted by the second power supply device exceeds a predetermined threshold.

9. The power supply control device according to claim 8, wherein the switching control device is configured to keep the second operating state of the power supply system in the electric power input forbidding state until the abnormal state of the first power supply device is detected.

\* \* \* \* \*